US012682206B2

(12) United States Patent
Tambe et al.

(10) Patent No.: US 12,682,206 B2
(45) Date of Patent: Jul. 14, 2026

(54) QUANTIZED NEURAL NETWORK TRAINING AND INFERENCE

(71) Applicant: NVIDIA CORPORATION, Santa Clara, CA (US)

(72) Inventors: Thierry Tambe, Cambridge, MA (US); Steve Dai, Union City, CA (US); Brucek Khailany, Austin, TX (US); Rangharajan Venkatesan, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 990 days.

(21) Appl. No.: 17/670,361

(22) Filed: Feb. 11, 2022

(65) Prior Publication Data

US 2023/0068941 A1 Mar. 2, 2023

Related U.S. Application Data

(60) Provisional application No. 63/238,036, filed on Aug. 27, 2021.

(51) Int. Cl.
*G06N 3/04* (2023.01)
*G06F 17/16* (2006.01)

(52) U.S. Cl.
CPC .............. *G06N 3/04* (2013.01); *G06F 17/16* (2013.01)

(58) Field of Classification Search
CPC ........ G06N 3/04; G06N 3/063; G06N 3/0495; G06N 3/084; G06N 3/09; G06F 17/16
See application file for complete search history.

(56) References Cited

U.S. PATENT DOCUMENTS

| | | | | |
|---|---|---|---|---|
| 11,755,901 | B2 * | 9/2023 | Deisher ................. | G06N 3/044 |
| | | | | 708/208 |
| 12,314,863 | B1 * | 5/2025 | Fang ...................... | G06N 20/00 |
| 2018/0322607 | A1 * | 11/2018 | Mellempudi ........ | G06N 3/0464 |
| 2020/0364558 | A1 * | 11/2020 | Kwon .................. | G06N 3/0495 |
| 2021/0160499 | A1 * | 5/2021 | Wang .................. | H04N 19/176 |
| 2022/0067512 | A1 * | 3/2022 | Khailany ................ | G06N 3/08 |
| 2023/0076138 | A1 * | 3/2023 | Whatmough .......... | G06N 3/063 |
| 2025/0037017 | A1 * | 1/2025 | Anufriev ................. | G06N 3/08 |

FOREIGN PATENT DOCUMENTS

| | | | | |
|---|---|---|---|---|
| CN | 108446761 A | * | 8/2018 | ............. G06N 3/048 |

OTHER PUBLICATIONS

Gvsl et al. ("Gvsl"), "Characterizing Quantum Supremacy in Near-Term Devices" published on Apr. 15, 2017 (Year: 2017).*

(Continued)

*Primary Examiner* — James T Tsai

(74) *Attorney, Agent, or Firm* — Artegis Law Group, LLP

(57) ABSTRACT

One embodiment of a computer-implemented method for processing a neural network comprises receiving a first quantized matrix that corresponds to a portion of a multi-dimensional input tensor and has been quantized based on a first scale factor; and performing one or more computational operations using the first quantized matrix and the first scale factor to generate one or more data values that correspond to a first portion of a multi-dimensional output tensor.

21 Claims, 6 Drawing Sheets

(56) References Cited

OTHER PUBLICATIONS

Z. Liu, G. Li and J. Cheng, "Hardware Acceleration of Fully Quantized BERT for Efficient Natural Language Processing," 2021 Design, Automation & Test in Europe Conference & Exhibition (DATE), Grenoble, France, 2021, pp. 513-516, doi: 10.23919/DATE51398.2021.9474043. (Year: 2021).*

Dave, et al. ("Dave"), "Hardware Acceleration of Sparse and Irregular Tensor Computations of ML Models: A Survey and Insights," published on Oct. 10, 2021. (Year: 2021).*

Krishnamoorthi, "Quantizing deep convolutional networks for efficient inference: A whitepaper," published Jun. 21, 2018. (Year: 2018).*

"Jung"), Memory management of multicore systems to accelerate memory intensive applications, published in 2018. (Year: 2018).*

Tambe, Thierry, et al., "Algorithm-Hardware Co-Design of Adaptive Floating-Point Encodings for Resilient Deep Learning Inference" Harvard University, Cambridge, MA, Cornell Tech, New York, NY, Jul. 20, 2020, 6 pages.

Dai, Steve, et al., "VS-Quant: Per-Vector Scaled Quantization for Accurate Low-Precision Neural Network Inference" arXiv:2102.04503v1 [cs.LG] Feb. 8, 2021, 12 pages.

Pratap et al., "Hybrid and Non-Uniform Quantization Methods using Retro Synthesis Data for Efficient Inference", arXiv:2012.13716, Dec. 26, 2020, pp. 1-12.

* cited by examiner

Forward
Propagation
300

Output Activations 306

Weights 304

Input Activations 302

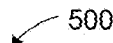

500

Receive first set of input data and first set of scale factors corresponding to the first set of input data
502

Store first set of input data in first data buffer
504

Receive second set of input data and second set of scale factors corresponding to the second set of input data
506

Store second set of input data in second data buffer
508

Perform one or more neural network computations using first set of input data, second set of input data, first set of scale factors and second set of scale factors
510

Perform one or more post-processing operations to generate processed output data
512

Transmit processed output data
514

FIG. 5

QUANTIZED NEURAL NETWORK TRAINING AND INFERENCE

CROSS-REFERENCE TO RELATED APPLICATIONS

This application claims the priority benefit of United States provisional patent application titled, "TECHNIQUES FOR QUANTIZED FIXED-POINT TRAINING WITH FINE-GRAINED SCALING AND ADAPTIVE PRECISION," filed on Aug. 27, 2021, and having Ser. No. 63/238,036. The subject matter of this related application is hereby incorporated herein by reference.

BACKGROUND

Field of the Various Embodiments

Embodiments of the present disclosure relate generally to computer science and artificial intelligence and, more specifically, to techniques for quantized neural network training and inference.

Description of the Related Art

Deep neural networks typically include a large number of computationally-heavy layers, such as convolutional layers and/or fully-connected layers. Deep neural networks also are usually trained and deployed using full-precision arithmetic (e.g., using 32-bit floating point data). As a result, executing deep neural networks can involve a substantial amount of computational complexity, latency, and memory consumption. To reduce the processing time and memory footprint associated with deep neural networks, the weights and/or activations of a neural network can be quantized. For example, the 32-bit floating point data values used for the weights and/or activations could be mapped to 16-bit floating point data values or 8-bit integer data values, which reduces the bit-width of the data values. Reducing the bit-width of the data values, in turn, reduces the complexity of the different calculations performed when training and deploying a deep neural network, such as matrix multiplication operations, as well as the amount of memory needed to store the data values.

Typically, to quantize the weights and activations of a neural network, a scale factor is applied to both a weight tensor that represents the weights as well as an activation tensor that represents the activations. However, because the same scale factor is shared across the many dimensions of a given tensor, the precision of the individual elements within a scaled tensor is reduced, thereby increasing the amount of error introduced by quantization and, in turn, reducing the overall accuracy of the deep neural network.

To improve the accuracy of the deep neural network, different scale factors could be applied to different vectors along a single dimension of the weight tensor and/or the activation tensor. Doing so would allow more suitable scale factors to be used for the different vectors, which would reduce the amount of error introduced by quantization and, in turn, improve the overall accuracy of the deep neural network. However, unlike neural network inference operations, which typically involve calculations using only matrices, neural network training operations normally involve calculations using both matrices and transposed matrices. Notably, when a matrix is transposed, each column of the transposed matrix corresponds to multiple different scale factors. Because each of the multiple different scale factors has to be read separately from memory, computations involving transposed matrices increase overall processing time. For example, if reading a scale factor from memory takes one clock cycle then, for a 4×4 transposed matrix, reading the related scale factors from memory would take four clock cycles for each column of the transposed matrix. Accordingly, applying different scale factors along a single dimension of a weight tensor and/or an activation tensor can substantially increase processing times when training deep neural networks.

As the foregoing illustrates, what is needed in the art are more effective techniques for quantizing weights and activations for neural networks.

SUMMARY

One embodiment of the present disclosure sets forth a computer-implemented method for processing a neural network. The method includes receiving a first quantized matrix that corresponds to a portion of a multi-dimensional input tensor and has been quantized based on a first scale factor. The method further includes performing one or more computational operations using the first quantized matrix and the first scale factor to generate one or more data values that correspond to a first portion of a multi-dimensional output tensor.

At least one technical advantage of the disclosed techniques relative to the prior art is that, with the disclosed techniques, neural network training operations can be performed more efficiently. In that regard, with the disclosed techniques, different scale factors are applied to different sub-matrices along multiple dimensions of a tensor, as opposed to different vectors along a single dimension of the tensor. Accordingly, the same scale factor can be applied to both a sub-matrix within a matrix and the corresponding sub-matrix within the corresponding transposed matrix. As a result, performing computations with a transposed matrix uses fewer read operations relative to prior art approaches, thereby reducing processing times when training neural networks. These technical advantages provide one or more technological improvement over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 5 is a flowchart of method steps for performing one or more neural network computational operations using quantized data, according to various embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
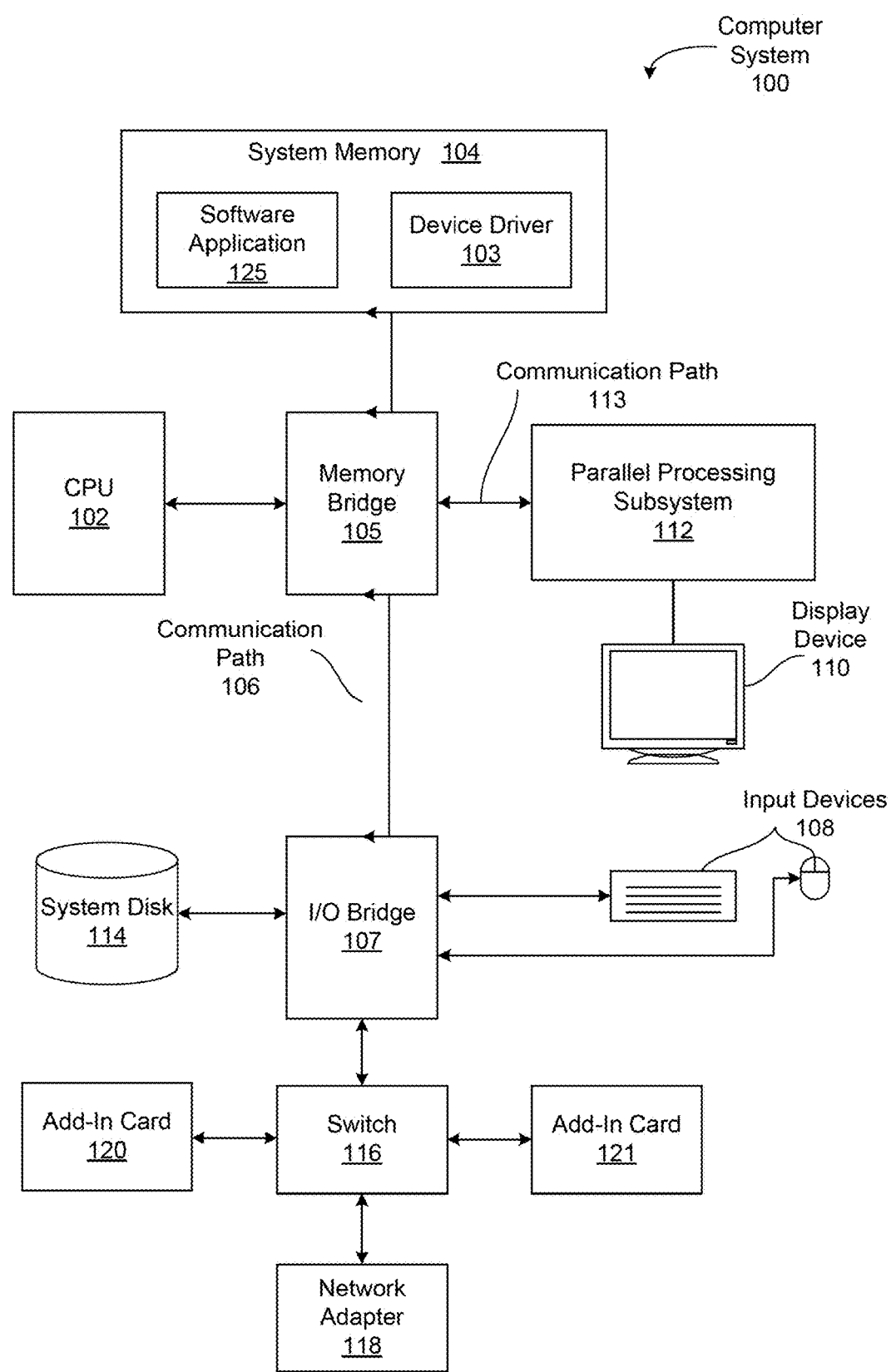
FIG. 1 is a block diagram illustrating a computer system configured to implement one or more aspects of the various embodiments.

FIG. 1 is a block diagram illustrating a computer system 100 configured to implement one or more aspects of the various embodiments. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point to point communication protocol known in the art.

In some embodiments, parallel processing subsystem 112 comprises a graphics subsystem that delivers pixels to a display device 110 that can be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry can be incorporated across one or more parallel processing units (PPUs) included within parallel processing subsystem 112 that are configured to perform graphics and video processing operations. In other embodiments, parallel processing subsystem 112 comprises a deep learning subsystem that trains neural network models and/or utilizes trained neural network models. In such embodiments, the parallel processing subsystem 112 incorporates circuitry optimized for performing neural network training and neural network inference operations including, for example, multiplier-accumulators (MAC units). As discussed in further detail below in FIG. 2, such circuitry can be incorporated across one or more PPUs included within parallel processing subsystem 112 that are configured to perform neural network training and/or inference operations. In yet other embodiments, the parallel processing subsystem 112 incorporates circuitry optimized for general purpose and/or compute processing. Again, such circuitry can be incorporated across one or more PPUs included within parallel processing subsystem 112 that are configured to perform such general purpose and/or compute operations.

In various embodiments, the one or more PPUs included within parallel processing subsystem 112 may be configured to perform graphics processing, neural network training and inference, general purpose processing, and compute processing operations. System memory 104 includes at least one device driver 103 configured to manage the processing operations of the one or more PPUs within parallel processing subsystem 112. The system memory 104 also includes a software application 125 that executes on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add in cards 120, 121 would connect directly to I/O bridge 107.

Figure 2:
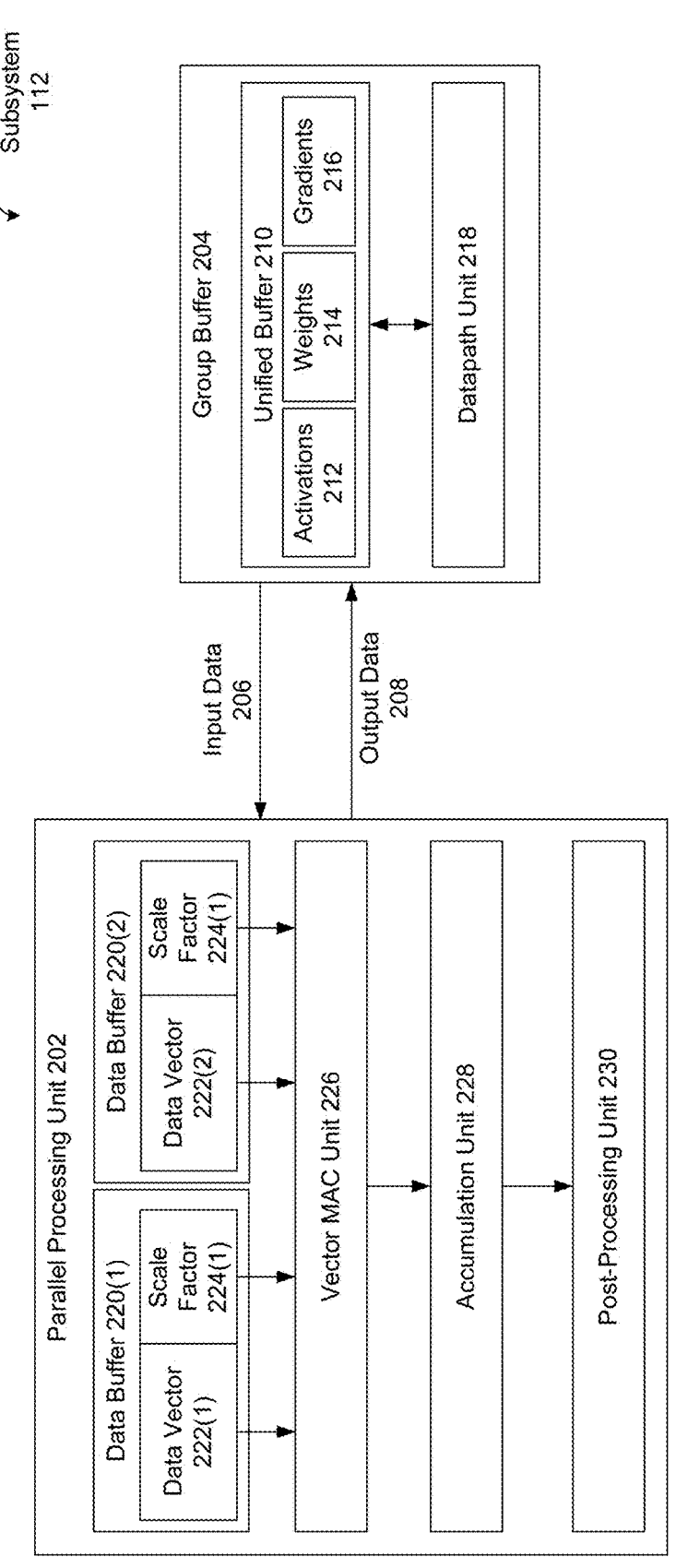
FIG. 2 is a block diagram of a parallel processing unit included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. As shown, PPU 202 communicates with a group buffer 204. PPU 202 and group buffer 204 can be implemented using one or more integrated circuit devices, such as programmable processors, application specific integrated circuits, memory devices, or in any other technically feasible fashion. PPU 202 can communicate with group buffer 204 in any technically feasible fashion. In some embodiments, PPU 202 communicates with group buffer 204 via a data router (not shown).

In some embodiments, PPU 202 comprises a neural network processing element (PE) that is configured to perform various operations related to training and inference of neural networks based on input data supplied by CPU 102 and/or system memory 104. In such cases, group buffer 204 stores neural network parameters for performing the neural network training and inference operations, such as input activations, output activations, weights, input gradients, and/or output gradients for each layer of the neural network. As shown, group buffer 204 includes a unified buffer 210 that stores activations 212, weights 214, and gradients 216 associated with a neural network.

In operation, group buffer 210 retrieves data stored in unified buffer 210 (e.g., activations 212, weights 214, and/or gradients 216) and transmits the data as input data 206 to PPU 202. PPU 202 receives the input data 206 and performs one or more computational operations for neural network training and/or inference on the input data 206 to generate corresponding output data 208. As discussed in further detail below, the one or more computation operations include, for example, matrix multiplication, vector dot product, data scaling, and data quantization. After generating the output data 208, PPU 202 transmits the output data 208 to group buffer 204. Group buffer 204 stores the output data in unified buffer 210. The stored output data 208 can be subsequently retrieved and transmitted to PPU 202 as additional input data 206.

In some embodiments, group buffer 204 identifies a portion of the data stored in unified buffer 210 to transmit to PPU 202 for processing. Identifying the portion of data to transmit to PPU 202 could include, for example, identifying input data for a current layer of the neural network, identifying input data for a current neural network operation, and the like.

In some embodiments, unified buffer 210 includes multiple sets of data, where each set is associated with a different layer of a neural network. Group buffer 204 identifies, for a current layer of the neural network, one or more sets of data corresponding to the current layer of the neural network. For example, activations 212 could include different sets of output activations, where each set of output activations is generated by computational operations performed for a different layer of the neural network. Group buffer 204 identifies, based on a current layer of the neural network, one or more sets of output activations, generated by one or more previous layers, that should be used as input activations for the current layer of the neural network. Group buffer 204 retrieves the one or more sets of output activations from unified buffer 210. As another example, weights 214 could include different sets of weights, where each set of weights is associated with a different layer of the neural network. Group buffer 204 identifies, based on a current layer of the neural network, a set of weights associated with the current layer of the neural network. Group buffer 204 retrieves the identified set of weights from unified buffer 210.

In some embodiments, group buffer 204 identifies, based on a type of neural network processing being performed by the PPU 202, one or more sets of data used as input for neural network computations for the current layer. For example, neural network inference includes forward propagation, while neural network training includes both forward propagation and backward propagation. Forward propagation includes performing computations between a set of input activations and a set of weights to generate a set of output activations. Backward propagation includes performing computations between a set of output activation gradients and a set of transposed weights to generate a set of input activation gradients, as well as performing computations between a set of output activation gradients and a set of transposed input activations to generate a set of weight gradients.

Figure 3A:
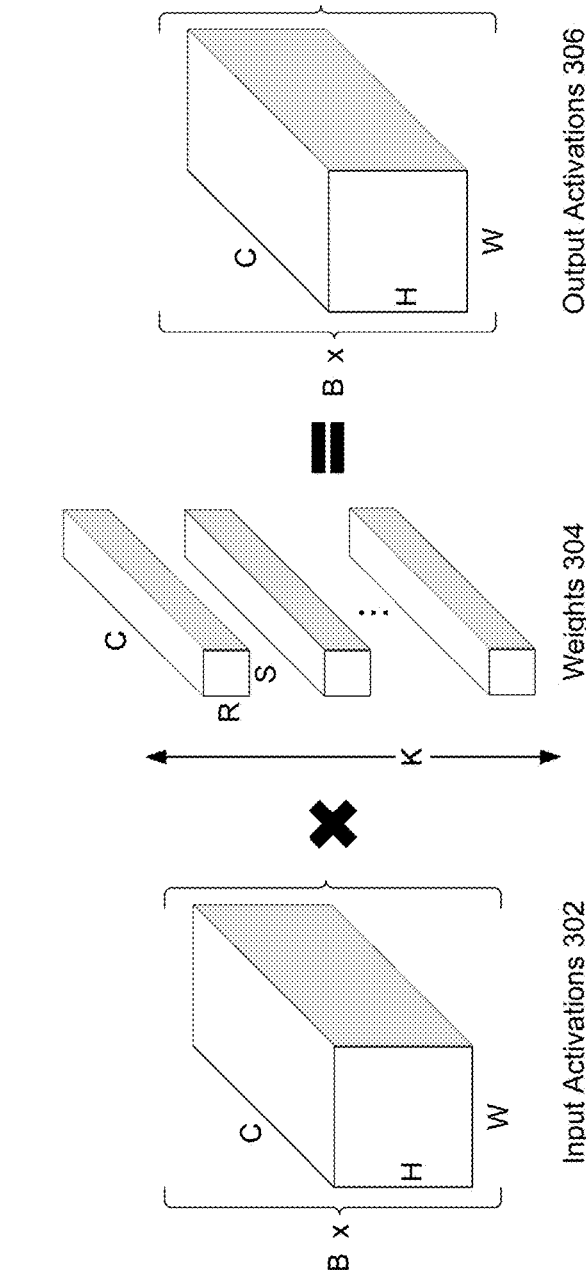
FIG. 3A illustrates exemplar inputs used and output generated when performing one or more forward propagation operations, according to various embodiments.

FIG. 3A illustrates the inputs used and output generated when performing forward propagation 300, according to various embodiments. As shown in FIG. 3A, forward propagation 300 involves performing computations between input activations 302 and weights 304 to generate output activations 306. The input activations 302, weights 304, and output activations 306 correspond to a specific layer of a neural network. That is, each layer of the neural network can involve a different set of input activations 302 and weights 304 and generate a corresponding set of output activations 306. When performing forward propagation 300 for a particular layer of the neural network, group buffer 204 retrieves a portion of activations 212 corresponding to the input activations 302 for the particular layer. Additionally, group buffer 204 retrieves a portion of weights 214 corresponding to the weights 304 for the particular layer. Group buffer 204 transmits the retrieved portion of activations 212 and the retrieved portion of weights 214 to PPU 202 as input 206.

Figure 3B:
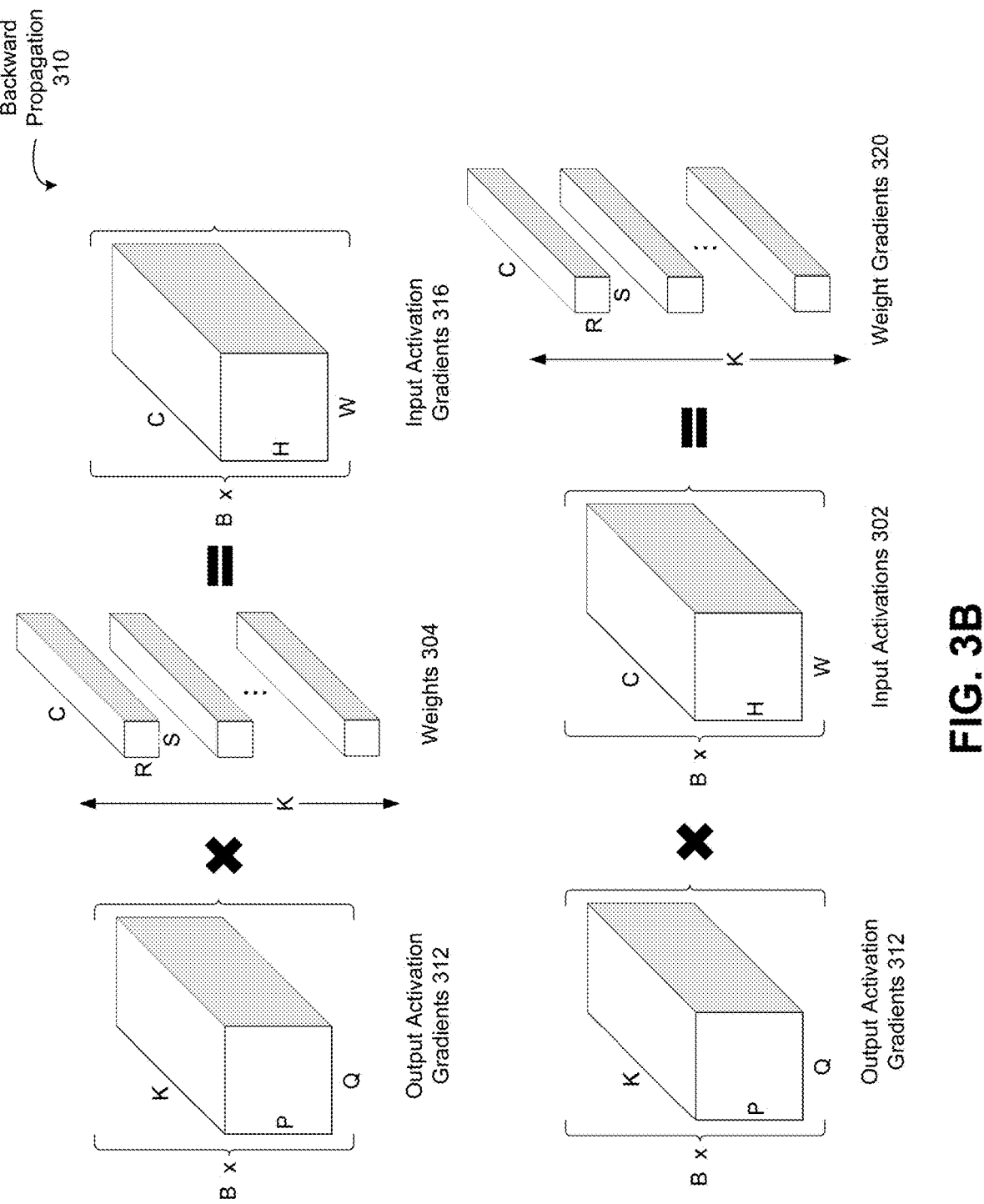
FIG. 3B illustrates exemplar inputs used and outputs generated when performing one or more backward propagation operations, according to various embodiments.

FIG. 3B illustrates the inputs used and outputs generated when performing backward propagation 310, according to various embodiments. As shown in FIG. 3B, backward propagation 310 generates two sets of outputs, input activation gradients 316 and weight gradients 320. Computations are performed between output activation gradients 312 and transposed weights 304 to generate input activation gradients 316. Computations are further performed between output activation gradients 312 and transposed input activations 302 to generate weight gradients 320. The output activation gradients 312, weights 304, inputs 302, input activation gradients 316 and weight gradients 320 correspond to a specific layer of a neural network. That is, each layer of the neural network can involve a different set of output activation gradients 312, transposed weights 304, and transposed inputs 302, and generate a corresponding set of input activation gradients 316 and weight gradients 320.

When performing backward propagation 310 for a particular layer of the neural network, group buffer 204 determines whether a current operation is to generate input activation gradients 316 or weight gradients 320. If the current operation is to generate input activation gradients 316, then group buffer 204 retrieves a portion of gradients 216 corresponding to the output activation gradients 312. Additionally, group buffer 204 retrieves a portion of weights 214 corresponding to the weights 304. In some embodiments, group buffer 204 transposes the retrieved portion of weights 214. If the current operation is to generate weight gradients 320, then group buffer 204 retrieves the portion of gradients 216 corresponding to the output activation gradients 312 and a portion of activations 212 corresponding to the input activations 302. In some embodiments, group buffer 204 transposes the retrieved portion of activations 212.

As shown in FIG. 2, group buffer 204 further includes a datapath unit 218. Datapath unit 218 is configured to receive data and perform one or more data processing operations on the received data. The one or more data processing operations include, for example, element-wise subtraction, truncation, and transposition. In some embodiments, datapath unit 218 receives data retrieved from unified buffer 210 and perform one or more data processing operations on the data prior to group buffer 204 transmitting the data to PPU 202. For example, as discussed above, backwards propagation includes performing computations using transposed weights and transposed input activations. Group buffer 204 retrieves a portion of weights 214 and sends the weights to datapath unit 218. Datapath unit 218 transposes the weights to generate transposed weights, and group buffer 204 transmits the transposed weights to PPU 202. Datapath unit 218 is configured to transpose data using any suitable techniques and/or algorithms. In some embodiments, datapath unit 218 transposes the data by causing data to be transmitted to PPU 202 in a transposed order.

In some embodiments, datapath unit 218 receives output data 208 transmitted by PPU 202 and performs one or more data processing operations on the output data 208. The data processing operations could include, for example, updating data stored in unified buffer 210 based on the output data 208, processing the output data 208 prior to storage in unified buffer 210, and the like. For example, during backwards propagation 310, PPU 202 generates weight gradients 320. Group buffer 204 receives output 208 that includes the weight gradients 320. Group buffer 204 transmits the output 208 to datapath unit 218. Datapath unit 218 identifies a set of weights included in weights 214 that correspond to the weight gradients 320, and performs element-wise subtraction between the set of weights and the weight gradients 320 to update the set of weights.

In various embodiments, activations 212, weights 214, and/or gradients 216 include quantized data. As discussed in further detail below, one or more data values, e.g., data values included in activations 212, weights 214, and/or gradients 216, are quantized from a high-precision, large bit-width data type to a smaller bit-width integer. Unified buffer 210 further includes the scale factor(s) used to quantize the one or more data values. In various embodiments, if data retrieved from unified buffer 210 includes quantized data, then group buffer 204 also retrieves the scale factor(s) used to generate the quantized data.

Fine-Grain Scaling for Neural Network Quantization

Quantization scales high-precision values of a given range to lower-precision values of a different range. An example equation for scaling a high-precision number x to a lower-precision number $x_q$ is given by equation (1):

$$x_q = Q\left(\frac{x}{s}, N\right) \tag{1}$$

In equation (1), s represents the scale factor and Q(a, b) represents a function that quantizes a value, a, to a b-bit integer. Accordingly, in equation (1), a high-precision number x is scaled by s, and the scaled value is quantized to an N-bit integer, $x_q$. Data values included in activations 212, weights 214, and/or gradients 216 can be quantized, for example, using equation (1) or other suitable quantization techniques. Different scale factors can be used to quantize each tensor included in activations 212, weights 214, and gradients 216. Additionally, different portions of each tensor can be quantized using a different scale factor. The scale factor can be any suitable numerical data format, such as an integer, floating-point, and the like.

The activations, weights, and if performing neural network training, gradients for each layer of a neural network each include a multi-dimensional tensor (e.g., input activations 302, weights 304, weights 304, input activations 302, and output activation gradients 312). To quantize a tensor, the tensor is sub-divided into multiple matrices (also referred to as sub-matrices) along multiple dimensions of the tensor. For each matrix, a scale factor is determined and used to quantize each element included in the matrix. Accordingly, different portions of the tensor can be quantized using different scale factors. Furthermore, because a single scale factor is used to quantize the elements of a given matrix, when the given matrix (or a larger matrix containing the given matrix) is transposed, the given matrix and the transposed matrix share the same, single scale factor. As a result, reading the scale factor for the matrix and the transposed matrix from memory takes the same amount of time and utilizes the same number of read operations.

In some embodiments, the dimensions of a tensor along which the tensor is sub-divided is based on the type of tensor (e.g., activation tensor, weight tensor, activation gradient tensor, or weight gradient tensor). For example, referring to FIG. 3A, input activations 302 includes dimensions B, H, W, and C, and weights 304 includes dimensions K, R, S, and C. Input activations 302 could be sub-divided along the B and C dimensions, while weights 304 could be sub-divided along the K and C dimensions. As another example, referring to FIG. 3B, output activation gradients 312 includes dimensions B, P, Q, and K; weights 304 includes dimensions K, R, S, and C; and input activations 302 includes dimensions B, H, W, and C. Output activation gradients 312 could be sub-divided along the B and K dimensions, weights 304 could be sub-divided along the K and C dimensions, while input activations 302 could be sub-divided along the B and C dimensions.

In some embodiments, each tensor is sub-divided into multiple matrices of the same size. Additionally, in some embodiments, each matrix has the same number of rows and columns. For example, input activations 302 and weights 304 could each be sub-divided into multiple matrices with V columns and V rows ($V^2$ matrices). In some embodiments, the number of rows and the number of columns included in each matrix (i.e., the size of V) corresponds to a size of a vector multiply-accumulate (MAC) unit 226 included in PPU 202. As discussed in further detail below, each vector MAC unit 226 is configured to perform computations between two sets of input elements of a given size. The size of the matrices that each tensor is sub-divided into is selected to match the number of input pairs that the vector MAC unit 226 receives as input. As a result, a vector MAC unit 226 can perform computations on an entire row or an entire column of a matrix.

In some embodiments, each quantized matrix is stored in unified buffer 210 in conjunction with the corresponding scale factor. When group buffer 204 retrieves a quantized matrix from unified buffer 210, group buffer 204 also retrieves the corresponding scale factor. Accordingly, both the quantized matrix and the corresponding scale factor included in the input 206 transmitted to PPU 202. As explained in further detail below, PPU 202 performs neural network training and/or inference computations using quantized values.

Quantized Neural Network Inference and Training

PPU 202 receives input data 206 transmitted by group buffer 204 and performs one or more computational operations for neural network training and/or neural network inference on the input data 206. In some embodiments, PPU 202 receives the input data 206 via a data router or other suitable communication path(s) within parallel processing subsystem 112. As shown in FIG. 2, PPU 202 includes one or more data buffers, such as data buffer 220(1) and data buffer 220(2), one or more vector multiply-accumulate (MAC) units 226, accumulation unit 228, and post-processing unit 230.

In some embodiments, the input data 206 received from group buffer 204 includes both a first set of input data corresponding to a first type of input data and a second set of input data corresponding to a second type of input data. The first type of input data and the second type of input data can vary depending on the particular neural network training or inference computations being performed and the type of target output. For example, for forward propagation, computations are performed between input activations and weights to generate output activations. PPU 202 could be configured to store weights in data buffer 220(1) and input activations in data buffer 220(2). As another example, backward propagation includes computations between output activation gradients and transposed input activations to generate weight gradients. PPU 202 could be configured to store transposed input activations in data buffer 220(1) and output activation gradients in data buffer 220(2).

In some embodiments, the input data 206 received from group buffer 204 includes only the first set of input data corresponding to the first type of input data. PPU 202 separately receives from group buffer 204 second input data 206 that includes the second set of input data corresponding to the second type of input data. In such embodiments, the number of sets of input data corresponding to the first type of input data and the number of sets of input data corresponding to the second type of input data could differ. For example, PPU 202 could receive a single set of weights and multiple sets of input activations. PPU 202 performs computations using each set of input activations and the same set of weights. As another example, PPU 202 could receive a set of output gradients and a set of transposed weights. PPU 202 performs computational operations on the set of output activation gradients and the set of transposed weights to generate a set of input activation gradients. PPU 202 then receives a set of transposed input activations, and performs computational operations using the same set of output activation gradients and the set of transposed input activations to generate a set of weight gradients.

PPU 202 stores the input data 206 in data buffer 220(1) and/or data buffer 220(2). In some embodiments, data buffer 220(1) and 220(2) each store a different type of input data. PPU 202 determines, based on the type of input data, where to store the input data 206. For example, PPU 202 could be configured to store weights in data buffer 220(1) and input activations in data buffer 220(2). If input data 206 includes weights, then PPU 202 stores the weights in data buffer 220(1). If input data 206 includes input activations, then PPU 202 stores the input activations in data buffer 220(2). In some embodiments, input data 206 includes multiple types of input data. PPU 202 partitions the input data 206 into multiple portions, where each portion corresponds to a different type of input data. PPU 202 determines, for each portion of input data 206, whether to store the portion of input data 206 in data buffer 220(1) or data buffer 220(2).

In various embodiments, when performing forward propagation, PPU 202 stores weights in data buffer 220(1) and input activations in data buffer 220(2). When performing backward propagation, PPU 202 stores transposed input activations or transposed weights in data buffer 220(1), depending on whether PPU 202 is computing input activation gradients or weight gradients, and stores output activation gradients in data buffer 220(2).

If the input data 206 includes quantized data, then the input data 206 further includes one or more scale factors used to generate the quantized data. PPU 202 stores the quantized data and the corresponding scale factors together in data buffer 220(1) and/or 220(2). As shown in FIG. 2, data buffer 220(1) stores one or more data vectors 222(1) and one or more corresponding scale factors 224(1), and data buffer 220(2) stores one or more data vectors 222(2) and one or more corresponding scale factors 224(2). In some embodiments, both the input data stored in data buffer 220(1) and the input data stored in data buffer 220(2) include quantized data. In other embodiments, one of the input data stored in data buffer 220(1) or data buffer 220(2) includes quantized data, while the input data stored in the other data buffer 220 does not.

As discussed above, to quantize a tensor, the tensor is divided into multiple matrices and each matrix is quantized using a corresponding scale factor. In some embodiments, each matrix and the corresponding scale factor are stored in the same row of a buffer (e.g., unified buffer 210, data buffer 220(1), and data buffer 220(2)). For example, each data vector 222(1) corresponds to a different matrix and each scale factor 224(1) corresponds to the scale factor used to quantize the corresponding matrix. Each data vector 222(1) and corresponding scale factor 224(1) are stored in the same row of data buffer 220(1). When reading data from the buffer, the elements of the matrix can be read together with the corresponding scale factor.

In some embodiments, data buffer 220(1) includes multiple memory banks. One or more memory banks store matrix elements and another memory bank stores scale factors. In various embodiments, each memory bank storing matrix elements stores a different row of the matrix. For example, the first row of each matrix is stored in a first memory bank, the second row of each matrix is stored in a second memory bank, and so on. In other embodiments, each memory bank storing matrix elements stores a different column of the matrix. For example, the first column of each matrix is stored in a first memory bank, the second column of each matrix is stored in a second memory bank, and so on.

To perform neural network computations, the one or more vector MAC units 226 read input data from data buffer 220(1) and data buffer 220(2) and perform one or more computations on the input data. In some embodiments, each vector MAC unit 226 is configured to read a first set of input data from data buffer 220(1) and a second set of input data from data buffer 220(2). For example, vector MAC unit 226 reads a data vector 222(1) and a scale factor 224(1) from data buffer 220(1) and a data vector 222(2) and a scale factor 224(2) from data buffer 220(2). Vector MAC unit 226 performs one or more computations using the elements in data vector 222(1), the elements in data vector 222(2), scale factor 224(1), and/or scale factor 224(2).

In some embodiments, vector MAC unit 226 multiples each element in data vector 222(1) with a corresponding element in data vector 222(2). Vector MAC unit 226 sums the product values to generate a partial sum. That is, vector MAC unit 226 computes a vector dot-product value between data vector 222(1) and data vector 222(2). Additionally, vector MAC unit 226 multiplies scale factor 224(1) and scale factor 224(2) to generate a scale factor product. Vector MAC unit 226 scales the partial sum based on scale factor 224(1) and scale factor 224(2), by multiplying the partial sum with the scale factor product, to generate a scaled partial sum. In some embodiments, vector MAC unit 226 rounds the scale factor product prior to multiplying the scale factor product with the partial sum.

In some embodiments, PPU 202 includes multiple vector MAC units 226. Each vector MAC unit 226 reads a different set of input data from data buffer 220(1) and/or data buffer 220(2). Accordingly, the vector MAC units 226 can perform computations on different pairs of input data sets in parallel, or substantially in parallel. The vector MAC units 226 could each read a different set of input data from data buffer 220(1) and the same set of input data from data buffer 220(2), the same set of input data from data buffer 220(1) and a different set of input data from data buffer 220(2), or a different set of input data from both data buffer 220(1) and data buffer 220(2).

In some embodiments, data buffer 220(1) and/or data buffer 220(2) include multiple memory banks, including one or more memory banks that store elements of a quantized matrix. Each vector MAC unit 226 reads a set of matrix elements from the same row of data buffer 220(1) and/or data buffer 220(2) but from but a different memory bank. In some embodiments, each memory bank included in the one or more memory banks stores a different row of the quantized matrix. When each vector MAC unit 226 reads from a different memory bank, each vector MAC unit 226 reads a different row of a quantized matrix from the data buffer. In some embodiments, each memory bank included in the one or more memory banks stores a different column of the quantized matrix. When each vector MAC unit 226 reads from a different memory bank, each vector MAC unit 226 reads a different column of a quantized matrix from the data buffer. Additionally, each vector MAC unit 226 could read a scale factor from the same memory bank. Because the same scale factor is used to quantize the elements of the matrix, the different rows and columns of the quantized matrix correspond to the same scale factor.

As discussed above, the number of rows and columns included in a quantized matrix can match the number of elements that each vector MAC unit 226 is configured to read from data buffer 220(1) or data buffer 220(2). For example, if a vector MAC unit 226 is configured to perform V multiplication operations in parallel, then each quantized matrix also has V rows and V columns. Additionally, in some embodiments, PPU 202 includes the same number of vector MAC units 226 as the size of each vector MAC unit 226. If each vector MAC unit 226 reads a different row or if each vector MAC unit 226 reads a different column of the matrix, then PPU 202 can perform computations for an entire matrix using the vector MAC units 226. Referring to the above example, PPU 202 includes V vector MAC units 226. V number of elements of a matrix are read by a total of V vector MAC units 226, which corresponds to $V^2$ elements, that is, the size of the matrix.

Accumulation unit 228 receives output generated by one or more vector MAC units 226, such as scaled partial sums, and accumulates the output. In some embodiments, the output generated by each vector MAC unit 226 corresponds to a particular position or element of an output tensor. Accumulation unit 228 accumulates, for each position or element of the output tensor, the output that corresponds to the position or element. After all of the input elements have been processed by the one or more vector MAC units 226, the accumulated output forms the completed output tensor. For example, referring to FIG. 3A, each scaled partial sum could correspond to a different element of output activations 306. Accumulation unit 228 accumulates, for each element of the output activations 306, the scaled partial sums generated by the one or more vector MAC units 226 that correspond to the element. After each element of input activations 302 and weights 304 is processed by the one or more vector MAC units 226, then output activations 306 is completed. In some embodiments, the accumulation unit contains an output address generator which computes the storage address of each partial sum. The accumulation unit determines which portion of the output tensor each partial sum belongs to using the storage address determined by the output address generator.

Post-processing unit 230 receives accumulated output from accumulation unit 228, such as an output activation tensor, weight gradient tensor, or input activation gradient tensor. In some embodiments, post-processing unit 230 performs one or more post-processing operations on the accumulated output prior to PPU 202 transmitting the accumulated output to group buffer 204. PPU 202 transmits the processed output as output 208 to group buffer 204.

In some embodiments, the one or more post-processing operations include quantizing each element included in the accumulated output. As discussed above, a tensor can be divided into multiple matrices, and each element of the matrix is quantized to an N-bit integer based on a scale factor. Post-processing unit 230 divides the output tensor into multiple matrices and quantizes each matrix using a corresponding scale factor. In some embodiments, post-processing unit 230 computes a scale factor for each matrix based on the elements included in the matrix. Any suitable algorithms or equations can be used to compute a scale factor for a matrix. An example function for computing a scale factor for a matrix is given by equation (2):

$$s = \frac{\max_i[X(i)]}{\left(2^{N-1} - 1\right)} \tag{2}$$

In equation (2), s, i, X(i), and N correspond to the scale factor for the matrix, the number of elements in the matrix, the i-th element of the matrix, and the bit-width to which values are being quantized, respectively. Accordingly, in equation (2), the scale factor for a matrix is computed based on the target bit-width and the maximum value included in the matrix.

Post-processing unit 230 quantizes the elements included in each matrix based on the computed scale factor. Quantizing the elements can be performed, for example, using equation (1) discussed above. In some embodiments, during neural network training, the bit-width, N, to which values are quantized varies depending on the current epoch. A first bit-width could be used for a number of epochs of neural network training, and after a threshold number of epochs, a second bit-width could be used. For example, values could be quantized to 4-bit integers from epoch 0 to epoch 75, and values could be quantized to 8-bit integers from epoch 76 to 86.

In some embodiments, post-processing unit 230 scales each element of the output tensor based on a per-layer scale factor prior to quantizing the elements of the output tensor. In addition to scale factors that are associated with different portions of a tensor, each layer of the neural network could be associated with a per-layer scale factor. Post-processing unit 230 scales each element of the output tensor using a per-layer scale factor. The per-layer scale factor is a scale factor associated with a current layer of the neural network, i.e., associated with the output tensor. In some embodiments, post-processing unit 230 receives a per-layer scale factor for scaling the output tensor, for example, as part of input data 206. In some embodiments, post-processing unit 230 computes a per-layer scale factor based on the values included in the output tensor. Any suitable algorithms or equations can be used to compute a per-layer scale factor. An example function for computing a per-layer scale factor is given by equation (3):

$$s_{layer} = \frac{\max_k[L]}{(2^{N-1}-1)} \qquad (3)$$

As shown in equation (3), a per-layer scale factor $s_{layer}$ is computed based on the elements k of the neural network layer L and the bit-width N used to quantize the elements.

In some embodiments, the one or more post-processing operations include processing the elements of the output tensor using a non-linear function. Post-processing unit 230 could process the elements of the output tensor using the non-linear function prior to quantizing the elements of the output tensor. In some embodiments, post-processing unit 230 scales the elements of the output tensor using the per-layer scale factor and processes the scaled elements using the non-linear function.

PPU 202 transmits the processed output tensor as output 208 to group buffer 204. In some embodiments, PPU 202 also includes one or more scale factors in output 208. The one or more scale factors include, for example, the scale factors used to quantize the different portions of the output tensor and/or the per-layer scale factor used to scale the output tensor.

Figure 4:
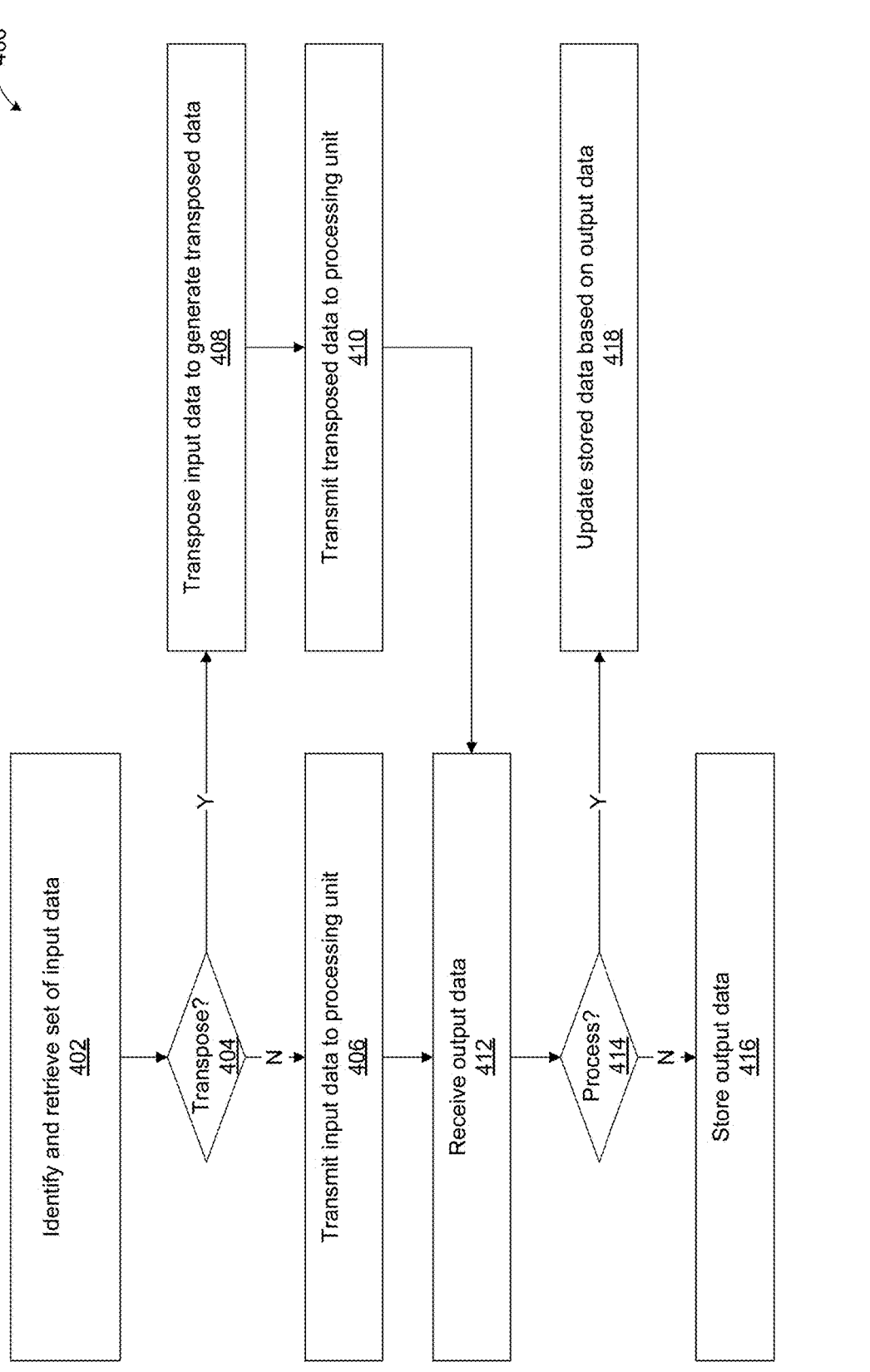
FIG. 4 is a flowchart of method steps for retrieving data from and storing data to a group buffer, according to various embodiments.

FIG. 4 is a flowchart of method steps for retrieving data from and storing data to a group buffer 204 of FIG. 2, according to various embodiments. Although the method steps are described with reference to the systems of FIGS. 1 and 2, persons skilled in the art will understand that any system configured to implement the method steps, in any order, falls within the scope of the present invention.

As shown in FIG. 4, a method 400 begins at step 402, where group buffer 204 identifies a set of input data 206 to be transmitted to a PPU 202 and retrieving the set of input data 206 from unified buffer 210. Identifying the set of input data 206 is performed in a manner similar to that discussed above with respect to group buffer 204. Identifying the set of input data includes, for example, identifying input data for a current layer of the neural network, identifying input data for a current neural network operation, and the like. Group buffer 204 determines one or more memory addresses in unified buffer 210 corresponding to the input data and retrieves the input data from unified buffer 210 based on the one or more memory addresses.

In some embodiments, unified buffer 210 includes multiple sets of data, where each set is associated with a different layer of a neural network. Group buffer 204 identifies, for a current layer of the neural network, one or more sets of data corresponding to the current layer of the neural network.

In some embodiments, group buffer 204 identifies one or more sets of data used as input for neural network computations for the current layer based on a type of neural network computation being performed by the PPU 202. If PPU 202 is performing forward propagation calculations, then group buffer 204 identifies a set of weights 214 and a set of activations 212. If PPU 202 is performing backward propagation calculations to generate input activation gradients, group buffer 204 identifies a set of weights 214 and a set of activation gradients 216. If PPU 202 is performing backward propagation calculations to generate weight gradients, group buffer 204 identifies a set of activations 212 and a set of activation gradients 216.

At step 404, group buffer 204 determines whether to transpose the input data 206. Determining whether to transpose the input data 206 is based on a type of neural network computation being performed by the PPU 202. If PPU 202 is performing forward propagation calculations, the calculations are performing using non-transposed weights and activations. Accordingly, if PPU 202 is performing forward propagation calculations, then group buffer 204 determines that input data 206 should not be transposed.

If PPU 202 is performing backward propagation calculations to generate input activation gradients, then the calculations are performed using transposed weights. Accordingly, if PPU 202 is performing backward propagation calculations to generate input activation gradients and input data 206 includes weights, then group buffer 204 determines that the weights included in input data 206 should be transposed. If PPU 202 is performing backward propagation calculations to generate weight gradients, then the calculations are performed using transposed activations. Accordingly, if PPU 202 is performing backward propagation calculations to generate weight gradients and input data 206 includes activations, then group buffer 204 determines that the activations included in input data 206 should be transposed.

If group buffer 204 determines that the input data 206 should not be transposed, then the method proceeds to step 406, where group buffer 204 transmits the input data 206 to PPU 202. If the input data 206 includes quantized data, group buffer 204 also transmits one or more scale factors used to generate the quantized data.

If group buffer 204 determines that the input data 206 should be transposed, then the method proceeds to step 408, where group buffer 204 transposes the input data 206, or the portion of the input data 206. For example, if input data 206 includes both activation gradients and weights, then group buffer 204 transposes the weights but does not transpose the activation gradients. Transposing the input data 206 is performed in a manner similar to that discussed above with respect to group buffer 204 and datapath unit 218.

In some embodiments, group buffer 204 retrieves the data to be transposed from unified buffer 210 and transmits the retrieved data to datapath unit 218. Datapath unit 218 transposes the data to generate a set of transposed data.

In some embodiments, input data 206 includes multiple sets of input data. At step 404, group buffer 204 determines, for each set of input data, whether the set of input data should be transposed. For example, input data 206 could include a set of weights 214 and a set of gradients 216. Group buffer 204 determines that the weights 214 should be transposed and the gradients 216 should not be transposed. At step 408, group buffer 204 transposes the weights 214 but does not transpose the gradients 216.

At step 410, group buffer 204 transmits the input data 206, including the transposed data, to PPU 202. If the input data 206 includes quantized data, group buffer 204 also transmits one or more scale factors used to generate the quantized data.

At step 412, group buffer 204 receives output data 208 transmitted by PPU 202. The type of output data can vary depending on the type of input data 206 transmitted to PPU 202 and/or the type of neural network computations performed by PPU 202. If PPU 202 performed forward propagation computations, then output data 208 includes output activations. If PPU 202 performed backward propagation computations, then output data 208 includes gradients, such as weight gradients or input activation gradients. In some embodiments, the output data 208 includes quantized data, such as quantized output activations, quantized weight gradients, and/or quantized input activation gradients. If the output data 208 includes quantized data, then output data 208 further includes one or more scale factors used to generate the quantized data.

At step 414, group buffer 204 determines whether to process the output data 208. In some embodiments, determining whether to process the output data 208 is based on a type of data included in output data 208. For example, if the output data 208 includes weights, output activations, or input activation gradients, then group buffer 204 determines that the weights, output activations, or input activation gradients, whichever the case may be, should be stored in unified buffer 210 without further processing. If the output data 208 includes weight gradients, then group buffer 204 determines that the weights stored in unified buffer 210 should be updated based on the weight gradients.

If group buffer 204 determines that the output data 208 should not be processed, then at step 416, group buffer 204 stores the output data 208 in unified buffer 210. In some embodiments, storing the data in unified buffer 210 includes determining one or more memory addresses in unified buffer 210 corresponding to the output data 208 and storing the output data 208 based on the one or more memory addresses.

If group buffer 204 determines that the output data 208 should be processed, then at step 418, group buffer 204 processes the output data 208. In some embodiments, group buffer 204 transmits the output data 208 to datapath unit 218 for processing. Processing the output data 208 includes, for example, updating data stored in unified buffer 210 based on the output data 208.

FIG. 5 is a flowchart of method steps for performing neural network computational operations using quantized data, according to various embodiments. Although the method steps are described with reference to the systems of FIGS. 1 and 2, persons skilled in the art will understand that any system configured to implement the method steps, in any order, falls within the scope of the present invention.

As shown in FIG. 5, a method 500 begins at step 502, where PPU 202 receives a first set of input data and a first set of scale factors corresponding to the first set of input data from group buffer 204. Each scale factor included in the first set of scale factors was used to quantize a different subset of input data included in the first set of input data. The first set of input data could be, for example, a set of weights, input activations, output gradients, transposed weights, or transposed input activations. The type of input data is based on the expected input(s) for the current neural network computation being performed by PPU 202. For example, if PPU 202 is performing forward propagation computations, then the first set of input data could be a set of weights or a set of input activations.

At step 504, PPU 202 stores the first set of input data and the first set of scale factors in a first data buffer. Storing the first set of input data and the first set of scale factors is performed in a manner similar to that discussed above with respect to data buffers 220(1) and 220(2). In some embodiments, PPU 202 identifies the first data buffer from two or more data buffers included in PPU 202 (e.g., data buffers 220(1) and 220(2)) based on a type of data included in the first set of input data. For example, referring to FIG. 2, data buffer 220(1) could be configured to store a first type of input data, such as weights, while data buffer 220(2) could be configured to store a second type of input data, such as activations. PPU 202 determines whether to store the first set of input data to data buffer 220(1) or data buffer 220(2) based on whether the first set of input data is the first type of input data or the second type of input data.

In some embodiments, the first set of input data corresponds to a quantized multi-dimensional tensor. A multi-dimensional tensor is quantized by dividing the multi-dimensional tensor into multiple matrices. A scale factor is computed for each matrix and the elements in the matrix are quantized based on the computed scale factor. Each scale factor included in the first set of scale factors corresponds to a quantized matrix in the quantized multi-dimensional tensor. PPU 202 stores each scale factor adjacent to the corresponding quantized matrix such that the matrix values and the scale factor can be read or loaded at the same time. For example, the first data buffer could store data in multiple rows, and PPU 202 could store each quantized matrix and corresponding scale factor in a different row. Additionally, in some embodiments, the first data buffer includes multiple memory banks. In some embodiments, PPU 202 stores each column of the quantized matrix in the same row of a different memory bank. In other embodiments, PPU 202 stores each row of the quantized matrix in the same row of a different memory bank.

At step 506, PPU 202 receives a second set of input data and a second set of scale factors corresponding to the second set of input data from group buffer 204. Each scale factor included in the second set of scale factors was used to quantize a different subset of input data included in the second set of input data. The second set of input data could be, for example, a set of weights, input activations, output gradients, transposed weights, or transposed input activations. The type of input data of the second set of input data is based on the expected input(s) for the current neural network computation being performed by PPU 202 and the type of input data of the first set of input data. For example, if PPU 202 is performing forward propagation computations, and the first set of input data is a set of weights, then the second set of input data is a set of input activations.

At step 508, PPU 202 stores the second set of input data and the second set of scale factors in a second data buffer. Storing the second set of input data and the second set of scale factors is performed in a manner similar to that discussed above with respect to data buffers 220(1) and 220(2). In some embodiments, PPU 202 identifies the second data buffer from two or more data buffers included in PPU 202 (e.g., data buffers 220(1) and 220(2)) based on a type of data included in the second set of input data. For example, referring to FIG. 2, data buffer 220(1) could be configured to store a first type of input data, such as weights, while data buffer 220(2) could be configured to store a second type of input data, such as activations. PPU 202 determines whether to store the second set of input data to data buffer 220(1) or data buffer 220(2) based on whether the second set of input data is the first type of input data or the second type of input data. In some embodiments, PPU 202 identifies a data buffer that was not used to store the first set of input data.

In some embodiments, the second set of input data corresponds to a quantized multi-dimensional tensor, where each scale factor included in the second set of scale factors corresponds to a quantized matrix in the quantized multi-dimensional tensor. PPU 202 stores each scale factor adjacent to the corresponding quantized matrix such that the matrix values and the scale factor can be read or loaded at the same time. For example, the second data buffer could store data in multiple rows, and PPU 202 could store each quantized matrix and corresponding scale factor in a different row. Additionally, in some embodiments, the second data buffer includes multiple memory banks. In some embodiments, PPU 202 stores each column of the quantized matrix in the same row of a different memory bank. In other embodiments, PPU 202 stores each row of the quantized matrix in the same row of a different memory bank.

In some embodiments, two or more of the first set of input data, the first set of scale factors, the second set of input data, and the second set of scale factors are included in the same set of input data 206 received from group buffer 204. PPU 202 could partition the input data 206 into the two or more of the first set of input data, the first set of scale factors, the second set of input data, and the second set of scale factors.

In some embodiments, the second set of input data includes quantized data, but the first set of input data does not include quantized data. In such embodiments, at step 502, PPU 202 does not receive a first set of scale factors, and at step 504, PPU 202 does not store a first set of scale factors. Additionally, in some embodiments, the first set of input data includes quantized data, but the second set of input data does not include quantized data. In such embodiments, at step 506, PPU 202 does not receive a second set of scale factors, and at step 508, PPU 202 does not store a second set of scale factors.

In some embodiments, the above steps 502-504 and/or steps 506-508 can be repeated for additional input data of the same type. The number of times the above steps 502-504 are performed can differ from the number of times the above steps 506-508 are performed. For example, PPU 202 could receive a single set of weights but receive multiple sets of input activations. Additionally, the above steps 502-508 can be performed in a different order and/or in parallel. For example, steps 506-508 can be performed prior to or at the same time as step 502-504.

At step 510, PPU 202 performs one or more neural network computations using the first set of input data, the second set of input data, the first set of scale factors, and the second set of scale factors. Performing the one or more neural network computations is performed in a manner similar to that discussed above with respect to PPU 202, vector MAC unit 226, and accumulation unit 228. In some embodiments, the first set of input data corresponds to a first multi-dimensional tensor and the second set of input data corresponds to a second multi-dimensional tensor. Performing the one or more neural network computations includes performing matrix multiplication computations between matrices included in the first multi-dimensional tensor and matrices included in the second multi-dimensional tensor.

In some embodiments, PPU 202 reads a first row of data from the first data buffer and a second row of data from the second data buffer. The first row of data from the first data buffer corresponds to a first matrix included in the first set of input data and a scale factor corresponding to the first matrix. The second row of data from the second data buffer corresponds to a second matrix included in the second set of input data and a scale factor corresponding to the second matrix.

In some embodiments, PPU 202 reads a first row of data from a first memory bank in the first data buffer and a second row of data from a second memory bank in the second data buffer. The first row of data from the first memory bank corresponds to a column of a first matrix included in the first set of input data. The second row of data from the second memory bank corresponds to a column of a second matrix included in the second set of input data.

PPU 202 multiplies each element included in the row of data from the first data buffer with a corresponding element included in the row of data from the second data buffer. PPU

202 adds the products to generate a partial sum. Additionally, the scale factor corresponding to the first matrix is multiplied with the scale factor corresponding to the second matrix to generate a scale factor product. PPU 202 scales the partial sum by multiplying the partial sum with the scale factor product. If the first set of input data includes quantized data, but the second set of input data does not include quantized data, then PPU 202 scales the partial sum by multiplying the partial sum with the scale factor corresponding to the first matrix. Similarly, if the second set of input data includes quantized data, but the first set of input data does not include quantized data, then PPU 202 scales the partial sum by multiplying the partial sum with the scale factor corresponding to the second matrix.

PPU 202 repeats the multiplication and accumulation computations for each row of data from the first memory bank and the second memory bank to generate multiple partial sums. Each partial sum corresponds to a different element of a multi-dimensional output tensor. For each element of the output tensor, PPU 202 accumulates the partial sums that correspond to that element. After PPU 202 has finished performing computations on all of the data included in the first set of input data and the second set of input data, then the accumulated partial sums form a completed output tensor.

At step 512, PPU 202 performs one or more post-processing operations on the output data to generate processed output data. Performing the one or more post-processing operations is performed in a manner similar to that discussed above with respect to PPU 202 and post-processing unit 230.

In some embodiments, PPU 202 scales the output data based on a per-layer scale factor. Scaling the output data based on the per-layer scale factor includes scaling each element of an output tensor using the per-layer scale factor. In some embodiments, PPU 202 receives the per-layer scale factor in addition to or in conjunction with the first set of input data and/or the second set of input data. In some embodiments, PPU 202 computes a per-layer scale factor based on the output data.

In some embodiments, PPU 202 processes the output data using a non-linear function. Processing the output data using the non-linear function includes applying the non-linear function to each element of the output tensor. In some embodiments, PPU 202 first scales the output data based on a per-layer scale factor to generate scaled output data, and processes the scaled output data using the non-linear function.

In some embodiments, PPU 202 quantizes the output data to generate quantized output data. Quantizing the output data includes quantizing each element of the output tensor to an N-bit integer based on a scale factor. Quantizing an element is performed, for example, using equation (1) discussed above. Different elements of the output tensor can be quantized based on different scale factors. In some embodiments, PPU 202 divides the output tensor into multiple matrices and quantizes each matrix using a different scale factor. Additionally, in some embodiments, PPU 202 computes, for each matrix, the scale factor to use for quantizing the matrix elements.

In some embodiments, PPU 202 first scales the output data based on a per-layer scale factor and then quantizes the scaled output data. In other embodiments, PPU 202 scales the output data and processes the output data using the non-linear function prior to quantizing the output data.

In some embodiments, when performing neural network training computations, PPU 202 selects a bit-width for quantizing the output tensor based on a current epoch (iteration) of the neural network training. One benefit of using different bit-widths for different iterations of neural network training is that a lower bit-width can be used during earlier iterations of neural network training to improve energy efficiency and processing performance. A higher bit-width can be used for later iterations of neural network training, where higher-precision computations improve the accuracy of the neural network model.

At step 514, PPU 202 transmits processed output data 208 to group buffer 204. Transmitting the processed output data 208 includes transmitting the quantized output tensor and the different scale factors used to quantize the elements of the output tensor.

In sum, the disclosed techniques enable efficient neural network inference and neural network training computations using quantized input data. To generate a quantized tensor, a multi-dimensional tensor is divided into multiple sub-matrices along multiple dimensions of the tensor. Each sub-matrix is quantized based on a corresponding computed scale factor. The quantized sub-matrix is stored in conjunction with the corresponding scale factor. When performing neural network computations, each quantized sub-matrix and a corresponding scale factor are read from memory together. Neural network computations are performed using the quantized sub-matrix and the corresponding scale factor. When performing neural network computations using the transpose of a quantized sub-matrix, the same corresponding scale factor is read from memory with the transposed quantized sub-matrix. Neural network computations are then performed using the transposed quantized sub-matrix and the corresponding scale factor. Output data generated from the neural network computations is accumulated to form an output tensor. The output tensor quantized by dividing the output tensor into multiple matrices, and computing, for each matrix, a scale factor for quantizing the matrix. Each matrix is quantized using the computed scale factor to generate a quantized output tensor.

At least one technical advantage of the disclosed techniques relative to the prior art is that, with the disclosed techniques, neural network training operations can be performed more efficiently. In that regard, with the disclosed techniques, different scale factors are applied to different sub-matrices along multiple dimensions of a tensor, instead of to different vectors along a single dimension of the tensor. Accordingly, the same scale factor can be applied to both a sub-matrix within a matrix and the corresponding sub-matrix within the corresponding transposed matrix. As a result, performing computations with a transposed matrix uses fewer read operations relative to prior art approaches, thereby reducing processing times when training neural networks. These technical advantages provide one or more technological improvement over prior art approaches.

1. In some embodiments, a computer-implemented method for processing a neural network comprises receiving a first quantized matrix that corresponds to a portion of a multi-dimensional input tensor and has been quantized based on a first scale factor; and performing one or more computational operations using the first quantized matrix and the first scale factor to generate one or more data values that correspond to a first portion of a multi-dimensional output tensor.

2. The computer-implemented method of clause 1, further comprising receiving a second quantized matrix that corresponds to a portion of a second multi-dimensional input tensor and has been quantized based on a second scale factor; wherein performing the one or more computational operations further comprises using the second quantized matrix and the second scale factor to generate the one or more data values.

3. The computer-implemented method of clause 1 or 2, wherein performing the one or more computational operations comprises computing one or more dot-product values using the first quantized matrix and the second quantized matrix.

4. The computer-implemented method of any of clauses 1-3, wherein performing the one or more computational operations comprises scaling each dot-product value included in one or more dot-product values using the first scale factor and the second scale factor.

5. The computer-implemented method of any of clauses 1-4, wherein the first quantized matrix comprises a transposed matrix.

6. The computer-implemented method of any of clauses 1-5, wherein the first quantized matrix is included in a plurality of quantized matrices, wherein each quantized matrix included in the plurality of quantized matrices corresponds to a different portion of the multi-dimensional input tensor and has been quantized using a different scale factor.

7. The computer-implemented method of any of clauses 1-6, wherein performing the one or more computational operations further comprises, for each quantized matrix included in the plurality of quantized matrices, using the quantized matrix and an associated scale factor to generate one or more associated data values that correspond to a different portion of the multi-dimensional output tensor.

8. The computer-implemented method of any of clauses 1-7, further comprising scaling the multi-dimensional output tensor based on a second scale factor associated with the multi-dimensional output tensor.

9. The computer-implemented method of any of clauses 1-8, further comprising quantizing the multi-dimensional output tensor by subdividing the multi-dimensional output tensor into a plurality of matrices and quantizing each matrix included in the plurality of matrices.

10. The computer-implemented method of any of clauses 1-9, further comprising quantizing the multi-dimensional output tensor by computing, for each matrix included in a plurality of matrices that comprise the multi-dimensional output tensor, a corresponding scale factor based on one or more data values included in the matrix; and quantizing each matrix included in the plurality of matrices based on the corresponding scale factor.

11. In some embodiments, one or more non-transitory computer-readable media store instructions that, when executed by one or more processors, cause the one or more processors to perform the steps of receiving a first quantized matrix that corresponds to a portion of a multi-dimensional input tensor and has been quantized based on a first scale factor; and performing one or more computational operations using the first quantized matrix and the first scale factor to generate one or more data values that correspond to a first portion of a multi-dimensional output tensor.

12. The one or more non-transitory computer-readable media of clause 11, further comprising receiving a second quantized matrix that corresponds to a portion of a second multi-dimensional input tensor and has been quantized based on a second scale factor; wherein performing the one or more computational operations further comprises using the second quantized matrix and the second scale factor to generate the one or more data values.

13. The one or more non-transitory computer-readable media of clause 11 or 12, wherein performing the one or more computational operations comprises computing a first dot-product value between a first vector included in the first quantized matrix and a second vector included in the second quantized matrix.

14. The one or more non-transitory computer-readable media of any of clauses 11-13, wherein performing the one or more computational operations comprises scaling a first dot-product value based on at least one of the first scale factor or the second scale factor.

15. The one or more non-transitory computer-readable media of any of clauses 11-14, further comprising receiving the first scale factor and storing the first quantized matrix and the first scale factor in a data buffer.

16. The one or more non-transitory computer-readable media of any of clauses 11-15, wherein performing the one or more computational operations comprises reading a first set of input values included in the first quantized matrix from the data buffer; and reading the first scale factor from the data buffer, wherein the first set of input values also is used to perform the one or more computational operations.

17. The one or more non-transitory computer-readable media of any of clauses 11-16, wherein the data buffer comprises a plurality of rows, and wherein storing the first quantized matrix and the first scale factor in the data buffer comprises storing the first quantized matrix and the first scale factor in a first row included in the plurality of rows.

18. The one or more non-transitory computer-readable media of any of clauses 11-17, wherein the data buffer comprises a plurality of memory banks, wherein storing the first quantized matrix in the data buffer comprises for each column included in the first quantized matrix, storing the column in a different memory bank included in the plurality of memory banks.

19. The one or more non-transitory computer-readable media of any of clauses 11-18, wherein the first quantized matrix is included in a plurality of quantized matrices, wherein each quantized matrix included in the plurality of quantized matrices corresponds to a different portion of the multi-dimensional input tensor and has been quantized using a different scale factor, and further comprising for each quantized matrix included in the plurality of quantized matrices, receiving the quantized matrix and an associated scale factor, and storing the quantized matrix and the associated scale factor in a different row of a data buffer.

20. In some embodiments, a system comprises one or more memories storing instructions; and one or more processors that are coupled to the one or more memories and, when executing the instructions, perform the steps of: receiving a first quantized matrix that corresponds to a portion of a multi-dimensional input tensor and has been quantized based on a first scale factor; and performing one or more computational operations using the first quantized matrix and the first scale factor to generate one or more data values that correspond to a first portion of a multi-dimensional output tensor.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing a neural network, the method comprising:
    receiving a first quantized two-dimensional square matrix that corresponds to a portion of a multi-dimensional input tensor and has been quantized based on a first scale factor, wherein the multi-dimensional input tensor has more than two dimensions, and wherein a first two-dimensional square matrix sub-divided from the multi-dimensional input tensor is quantized using the first scale factor to generate the first quantized two-dimensional square matrix, and wherein the first two-dimensional square matrix has a number of rows and a number of columns corresponding to a size of a vector multiply-accumulate (MAC) unit that performs computations on the first quantized two-dimensional square matrix; and
    performing one or more computational operations using the first quantized two-dimensional square matrix and the first scale factor to generate one or more data values that correspond to a first portion of a multi-dimensional output tensor, wherein the one or more computational operations include one or more memory read operations.

2. The computer-implemented method of claim 1, further comprising:
    receiving a second quantized two-dimensional square matrix that corresponds to a portion of a second multi-dimensional input tensor and has been quantized based on a second scale factor;
    wherein performing the one or more computational operations further comprises using the second quantized two-dimensional square matrix and the second scale factor to generate the one or more data values.

3. The computer-implemented method of claim 2, wherein performing the one or more computational operations comprises computing one or more dot-product values using the first quantized two-dimensional square matrix and the second quantized two-dimensional square matrix.

4. The computer-implemented method of claim 2, wherein performing the one or more computational operations comprises scaling each dot-product value included in one or more dot-product values using the first scale factor and the second scale factor.

5. The computer-implemented method of claim 1, wherein the first quantized two-dimensional square matrix comprises a transposed matrix.

6. The computer-implemented method of claim 1, wherein the first quantized two-dimensional square matrix is included in a plurality of quantized two-dimensional square matrices, wherein each two-dimensional quantized square matrix included in the plurality of quantized two-dimensional square matrices corresponds to a different portion of the multi-dimensional input tensor and has been quantized using a different scale factor.

7. The computer-implemented method of claim 6, wherein performing the one or more computational operations further comprises, for each quantized two-dimensional square matrix included in the plurality of quantized two-dimensional square matrices, using the quantized two-dimensional square matrix and an associated scale factor to generate one or more associated data values that correspond to a different portion of the multi-dimensional output tensor.

8. The computer-implemented method of claim 1, further comprising scaling the multi-dimensional output tensor based on a second scale factor associated with the multi-dimensional output tensor.

9. The computer-implemented method of claim 1, further comprising quantizing the multi-dimensional output tensor by subdividing the multi-dimensional output tensor into a plurality of two-dimensional square matrices and quantizing each two-dimensional square matrix included in the plurality of two-dimensional square matrices.

10. The computer-implemented method of claim 1, further comprising quantizing the multi-dimensional output tensor by:
    computing, for each two-dimensional square matrix included in a plurality of two-dimensional square matrices that comprise the multi-dimensional output tensor, a corresponding scale factor based on one or more data values included in the two-dimensional square matrix; and
    quantizing each two-dimensional square matrix included in the plurality of two-dimensional square matrices based on the corresponding scale factor.

11. One or more non-transitory computer-readable media storing instructions that, when executed by one or more processors, cause the one or more processors to perform the steps of:
    receiving a first quantized two-dimensional square matrix that corresponds to a portion of a multi-dimensional input tensor and has been quantized based on a first scale factor, wherein the multi-dimensional input tensor has more than two dimensions, and wherein a first two-dimensional square matrix sub-divided from the multi-dimensional input tensor is quantized using the first scale factor to generate the first quantized two-dimensional square matrix, and wherein the first two-dimensional square matrix has a number of rows and a number of columns corresponding to a size of a vector multiply-accumulate (MAC) unit that performs computations on the first quantized two-dimensional square matrix; and
    performing one or more computational operations using the first quantized two-dimensional square matrix and the first scale factor to generate one or more data values that correspond to a first portion of a multi-dimensional output tensor, wherein the one or more computational operations include one or more memory read operations.

12. The one or more non-transitory computer-readable media of claim 11, further comprising:

receiving a second quantized two-dimensional square matrix that corresponds to a portion of a second multi-dimensional input tensor and has been quantized based on a second scale factor;

wherein performing the one or more computational operations further comprises using the second quantized two-dimensional square matrix and the second scale factor to generate the one or more data values.

13. The one or more non-transitory computer-readable media of claim 12, wherein performing the one or more computational operations comprises computing a first dot-product value between a first vector included in the first quantized two-dimensional square matrix and a second vector included in the second quantized two-dimensional square matrix.

14. The one or more non-transitory computer-readable media of claim 12, wherein performing the one or more computational operations comprises scaling a first dot-product value based on at least one of the first scale factor or the second scale factor.

15. The one or more non-transitory computer-readable media of claim 11, further comprising receiving the first scale factor and storing the first quantized two-dimensional square matrix and the first scale factor in a data buffer.

16. The one or more non-transitory computer-readable media of claim 15, wherein performing the one or more computational operations comprises reading a first set of input values included in the first quantized two-dimensional square matrix from the data buffer; and reading the first scale factor from the data buffer, wherein the first set of input values also is used to perform the one or more computational operations.

17. The one or more non-transitory computer-readable media of claim 15, wherein the data buffer comprises a plurality of rows, and wherein storing the first quantized two-dimensional square matrix and the first scale factor in the data buffer comprises storing the first quantized two-dimensional square matrix and the first scale factor in a first row included in the plurality of rows.

18. The one or more non-transitory computer-readable media of claim 15, wherein the data buffer comprises a plurality of memory banks, wherein storing the first quantized two-dimensional square matrix in the data buffer comprises for each column included in the first quantized two-dimensional square matrix, storing the column in a different memory bank included in the plurality of memory banks.

19. The one or more non-transitory computer-readable media of claim 11, wherein the first quantized two-dimensional square matrix is included in a plurality of quantized two-dimensional square matrices, wherein each quantized two-dimensional square matrix included in the plurality of quantized two-dimensional square matrices corresponds to a different portion of the multi-dimensional input tensor and has been quantized using a different scale factor, and further comprising for each quantized two-dimensional square matrix included in the plurality of quantized two-dimensional square matrices, receiving the quantized two-dimensional square matrix and an associated scale factor, and storing the quantized two-dimensional square matrix and the associated scale factor in a different row of a data buffer.

20. A system comprising:

one or more memories storing instructions; and one or more processors that are coupled to the one or more memories and, when executing the instructions, perform the steps of:

receiving a first quantized two-dimensional square matrix that corresponds to a portion of a multi-dimensional input tensor and has been quantized based on a first scale factor, wherein the multi-dimensional input tensor has more than two dimensions, and wherein a first two-dimensional square matrix sub-divided from the multi-dimensional input tensor is quantized using the first scale factor to generate the first quantized two-dimensional square matrix, and wherein the first two-dimensional square matrix has a number of rows and a number of columns corresponding to a size of a vector multiply-accumulate (MAC) unit that performs computations on the first quantized two-dimensional square matrix; and performing one or more computational operations using the first quantized two-dimensional square matrix and the first scale factor to generate one or more data values that correspond to a first portion of a multi-dimensional output tensor, wherein the one or more computational operations include one or more memory read operations.

21. The computer-implemented method of claim 1, wherein the number of rows and the number of columns of the first two-dimensional square matrix are selected to match a number of input pairs that the vector MAC unit receives as input, and wherein the vector MAC unit performs computations on an entire row or an entire column of the first two-dimensional square matrix.

\* \* \* \* \*